Sept. 12, 1939.　　　J. H. HECKERT　　　2,173,015
WHEEL MOUNTING FOR VEHICLES
Filed June 8, 1937　　　2 Sheets-Sheet 1

Inventor
James H. Heckert,
By Bailey & Carson
Attorneys

Sept. 12, 1939.　　　　J. H. HECKERT　　　　2,173,015
WHEEL MOUNTING FOR VEHICLES
Filed June 8, 1937　　　　2 Sheets-Sheet 2
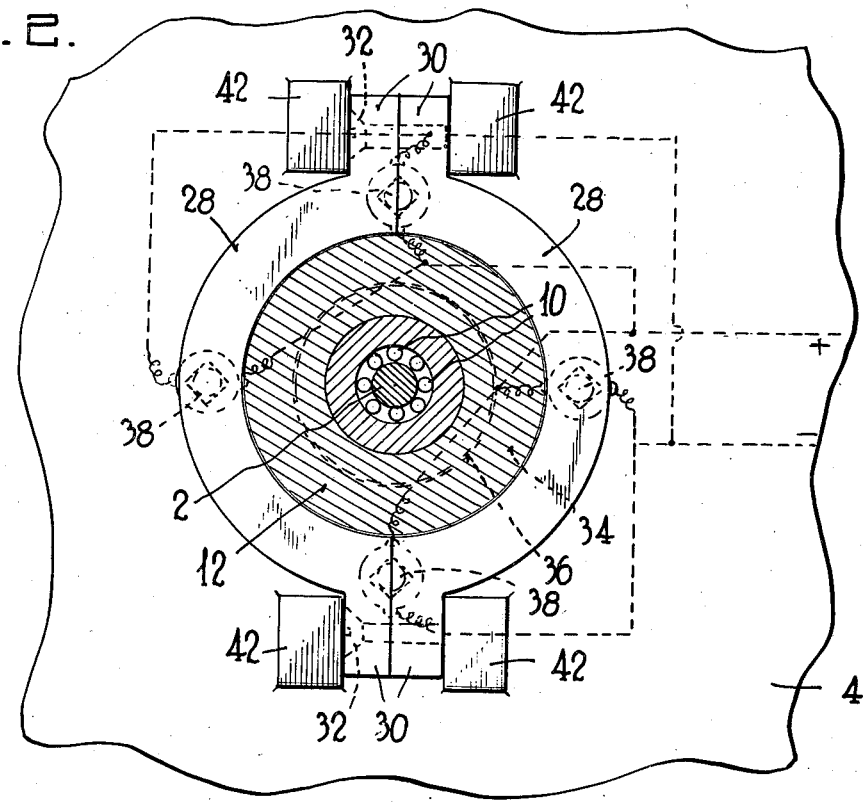
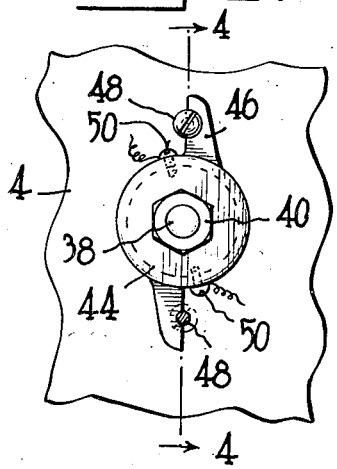
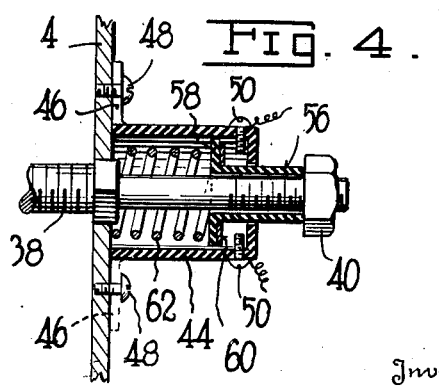
Inventor
James H. Heckert,
By Barley E. Carson
Attorneys Patented Sept. 12, 1939

2,173,015

UNITED STATES PATENT OFFICE 2,173,015

WHEEL MOUNTING FOR VEHICLES

James H. Heckert, Duquesne, Pa.

Application June 8, 1937, Serial No. 147,129

3 Claims. (Cl. 301—122)

The invention relates to safety devices for the mounting of vehicle wheels, and more particularly to such devices for use on automobile wheels provided with brakes.

The present type of wheel mounting generally includes a member which is secured on the axle only by a single hub nut, which may also be provided with a pin. To the member so secured on the axle there is removably secured by a plurality of nuts a rim portion carrying the tire.

Numerous accidents have occurred because the hub nut was released in one manner or another and thus the whole wheel was able to drop off the axle. This is particularly likely to happen since the nut is not only subjected to a longitudinal force but also is subjected to a frictional turning force by the wheel, which tends to unthread it. The use of cotter pins has not completely prevented this since these pins are often sheared by the forces developed in the movement of the vehicle.

The primary object of this invention is to provide a mounting for a wheel on a vehicle axle in which reliance is not placed merely on a single nut for holding the wheel, but on a plurality of nuts and bolts, and in which the nuts are not subjected to the turning movement of the wheel with respect to the axle, and therefore do not tend to come off.

A secondary object of the invention is to provide a device of this type in which the securing nuts are located on the inner face of the wheel so that they are protected and thus are not as likely to be disengaged.

Still a further object of the invention is to provide an arrangement of this type in which a member mounted on the fixed portion of the braking mechanism of the wheel interlocks with a member movable with the wheel, so that rotation is possible between the two, while movement longitudinally of the axle is not permitted.

A further object of the invention is to provide in a structure of this type a novel signalling means for indicating when the nuts are loosened so that the operator of the vehicle may realize that the wheel is in danger of coming off and take precautionary measures to correct this situation.

In particular, it is my object to provide a wheel mounting which permits the application thereto of such a signalling arrangement with ease and simplicity.

Further objects and advantages of the invention will be understood more fully from the following description, particularly when taken in conjunction with the accompanying drawings which form a part thereof.

In the drawings:

Fig. 2 is a cross section on the line 2—2 of Fig. 1;

Fig. 3 is an enlarged view of one of the nuts of Fig. 2 showing the signalling device;

Fig. 4 is a cross section substantially on the line 4—4 of Fig. 3.

Figure 1:
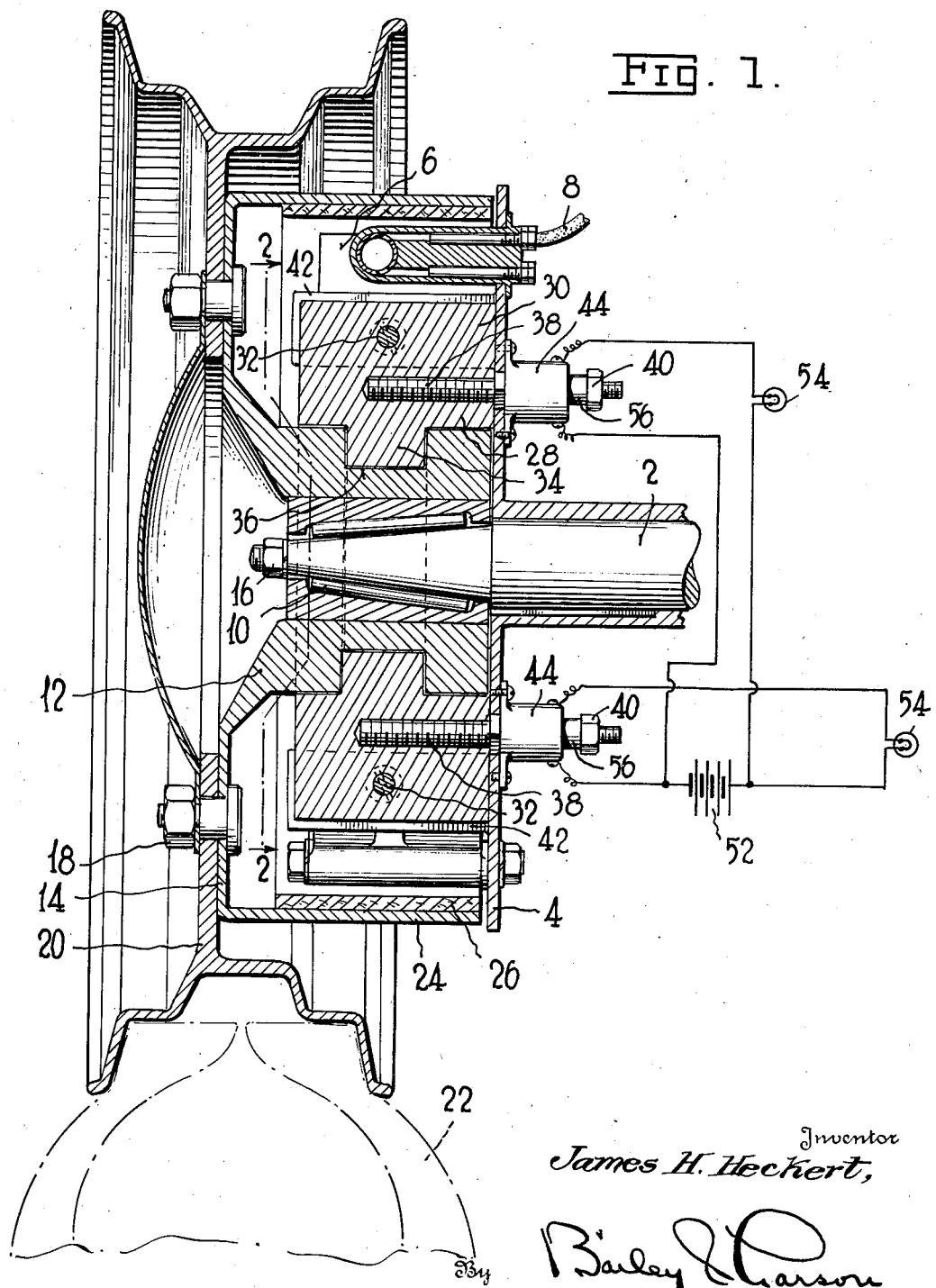
Fig. 1 is a vertical cross section through a wheel mounting embodying my invention.

As shown in the drawings, the arrangement is applied to an axle 2, although of course it will be understood that this axle might be of any suitable type, such as a stub axle, or the like. Rigidly mounted on the axle is a member 4 forming the brake shoe supporting plate, and carrying brake shoes 6 of any conventional type operated by a cable 8 or the like. The specific brake structure forms no part of this invention and therefore is not described in detail.

Rotatably mounted by bearings 10 on the axle 2 is a collar or hub member 12, to which is rigidly secured a disc 14. The collar 12 is held on the axle 2 by the means to be described below. The disc 14 is provided with a plurality of nuts and bolts 18 to which may be removably secured a rim or annulus 20 carrying the tire 22. This structure may be of any conventional type well known in the art for permitting the removal and replacement of the tire in case of need. The disc 14 also has an inwardly projecting portion 24 carrying a brake band 26 cooperating with the brake shoes 6, and of conventional type.

Mounted on the brake shoe supporting plate 4 is a split annular collar formed of two semi-circular sections 28 provided with projections 30 at their meeting edges, these projections being held together by flat head tap bolts 32 passing through one of the projections and threaded in the other, so that the collar forms a complete circle. This collar is formed with an inward annular flange or ridge 34, which engages in a groove 36 in the hub member 12. Thus when the collar 28 is in position the hub member 12 may turn freely with respect thereto, but cannot move longitudinally.

Extending through the collar 28 and the brake shoe supporting plate 4 are a plurality of double ended stud bolts 38. The ends of these bolts are preferably threaded in the collar 28, and the portions of the bolts which extend through the brake supporting plate 4 are square in cross section and extend through square holes in the plate 4. The bolts are secured by nuts 40, with the interposition of a signalling mechanism of the type to be described below where desired.

The plate 4 carries on its front face, or in other words, the face next to the collar 28, four lugs 42 which, when the device is assembled, lie on opposite sides of the ends of bolts 32 and thus prevent the disengagement of these nuts and the release of the collar 28.

It will be evident that with the described construction reliance is not placed on a hub nut for holding the wheel on the axle, and this nut is not used. For the wheel to be removed, it is necessary for all the nuts 40 to be released, and this is not likely to happen. This is particularly true since the nuts 40 are not subjected in any manner to the turning motion of the wheel, as is the hub nut. Furthermore, the interlocking between the ridge 34 and groove 36 gives a freedom of movement to the wheel, while absolutely limiting its longitudinal movement.

However, it may be desirable to indicate to the driver of the vehicle that the wheel is in danger of coming off. The particular construction shown utilizing the bolts 38 extending through the brake supporting plate and the nuts thereon is in such a position that these bolts are substantially stationary with respect to the vehicle and that the nuts must move away from the brake plate to be released, making it possible to use a special type of signalling device.

This arrangement is shown in detail in Figs. 3 and 4 of the drawings. Mounted around each of the bolts 38 and at the rear or exposed face of the plate 4 are sleeves or cylinders 44 of insulating material. The cylinders 44 are held in place by means of projections 46 forming hooks which engage beneath the head of screws 48 mounted in the plate 4, although any other suitable type of connection may be used. At opposite sides of the upper portion of the inside of cylinders 44 are arranged electrical contacts 50 connected in series with the battery 52 and a signalling device 55 such as a lamp which might be mounted at any point where it is visible to the driver of the vehicle. Slidable within the cylinders 44 of insulating material are sleeves 56 also of insulating material having at their lower ends outwardly extending flanges 58 on the upper surfaces of which are mounted annular rings 60 of conducting material. It will be obvious that when these discs engage the contacts 50 they will close the circuits and thus operate the signal 54. Coil springs 62 are arranged within the cylinders 44 below and bearing against the flanges 58. Of course as shown in Fig. 2 one of these devices may be provided for each of the bolts 38, and they would then be connected in parallel so that any of them would operate the signal 54.

If any of the nuts 40 becomes loose, and moves toward the end of the bolts, the spring 62 will cause the sleeve 56 to follow the movement of the nut, against the lower surface of which it engages, until the ring 60 engages the contacts 50 and closes the circuit to operate the signal.

It is thus possible for the driver to detect any loosening of the nuts which would tend to endanger the safety of the occupants of the vehicle.

Obviously while the safety arrangement described is particularly applicable to the present construction, it is also of general application where it is desirable to detect the loosening of a nut of any type.

In case of puncture or the like, all that is necessary is to release the nuts 18 and replace the rim 20 and tire 22. In case the wheel is to be removed from the axle, however, it is necessary to remove the four nuts 40, whereupon the bolts 38 may be pulled out of the disc 4 and the whole wheel can be thus taken off.

It will be evident that it is thus extremely difficult for the wheel to come off accidentally, but that the removal of the wheel for purposes of repair presents no particular problems.

While I have described herein one embodiment of my invention, I wish it to be understood that I do not intend to be limited thereby except within the scope of the appended claims.

What I claim is:

1. In combination, an axle, a wheel rotatably mounted on the axle, a brake supporting member fixedly mounted on the axle, cooperating braking means on the wheel and the brake supporting member, and interlocking members respectively secured to said wheel and said brake supporting member for preventing relative movement between the wheel and the brake supporting member longitudinally of the axle, said interlocking members mounting said wheel for turning movement with respect to the brake supporting member.

2. In combination, an axle, a wheel rotatably mounted on the axle, a brake supporting member fixedly mounted on the axle, cooperating braking means on the wheel and the brake supporting member, and interlocking members respectively secured to said wheel and said brake supporting member and arranged therebetween for preventing relative movement between the wheel and the brake supporting member longitudinally of the axle, said interlocking members mounting said wheel for turning movement with respect to the brake supporting member, and means accessible from the rear face of said brake supporting member for releasably connecting said second interlocking member thereto.

3. In combination, an axle, a wheel member rotatably mounted on said axle, a brake supporting member fixed on said axle, an annular split ring element secured to one of said members, means releasably holding the portions of said ring together, an element secured to the other member, bolts passing through one of said elements and said brake supporting member, nuts on said bolts on the rear face of said brake supporting member, one of said elements having an annular groove therein and the other element having a portion engaging in said groove.

JAMES H. HECKERT.